July 8, 1952  B. N. ASHTON ET AL  2,602,298

EQUALIZING VALVE FOR PLURAL MOTOR SYSTEMS

Filed Sept. 1, 1949

INVENTORS.
BENJAMIN N. ASHTON
EUGENE V. BARKOW

THEIR ATTORNEYS.

Patented July 8, 1952

2,602,298

UNITED STATES PATENT OFFICE 2,602,298

EQUALIZING VALVE FOR PLURAL MOTOR SYSTEMS

Benjamin N. Ashton and Eugene V. Barkow, Kingston, N. Y., assignors to Electrol Incorporated, Kingston, N. Y., a corporation of Delaware Application September 1, 1949, Serial No. 113,526

4 Claims. (Cl. 60—97)

This invention relates to systems for controlling the movement of a plurality of hydraulically actuated motors to equalize their movements. More particularly, the invention relates to control valve systems for regulating the supply of fluid delivered to a plurality of hydraulic motors, such as, for example, hydraulic rams or jacks to cause equal movement of the jacks.

In accordance with the present invention, a typical system may include at least two equalizing valves of a type having valve elements displaceable against a biasing force by the pressure of the fluid supplied to at least two hydraulic motors, the motors being in turn connected to and controlling the biasing force exerted on the movable valve elements. The relation of the biasing force and the movement of the motors is such that any tendency of one of the motors to move faster than the other motor will increase the biasing force opposing the flow of liquid to the faster moving motor and thereby reduce the pressure and volume of the liquid actuating the faster moving motor to reduce its speed.

Systems of the type generally referred to above are useful for many purposes, for example, in the operation of jacks for lifting the front or rear of a vehicle, in systems wherein a platform is to be elevated and kept level during its movement and for actuating wing flaps and landing gear of aircraft and the like.

Figure 1:
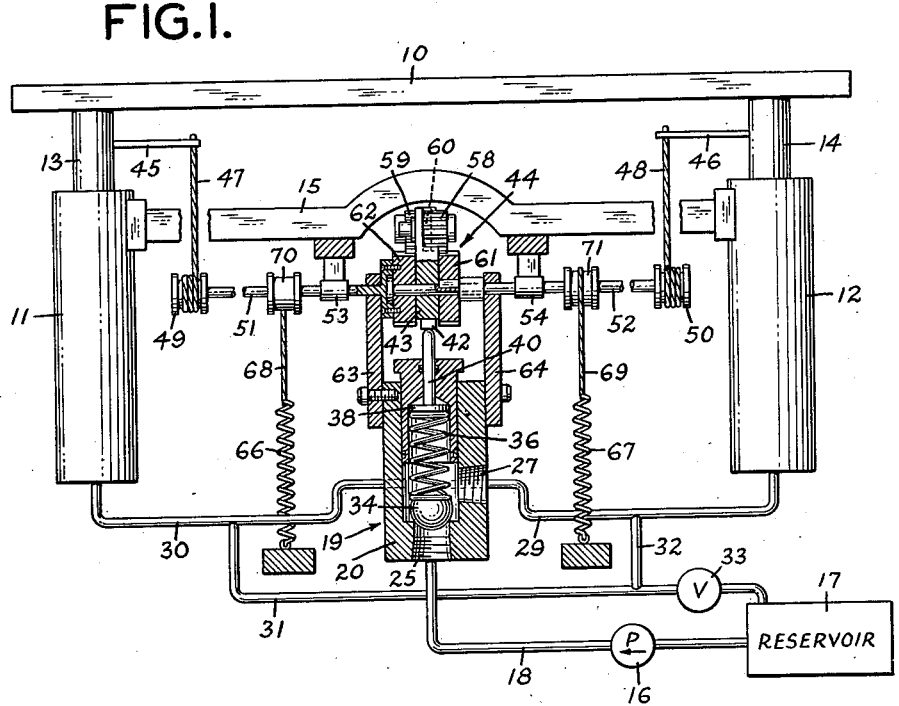
Figure 2:
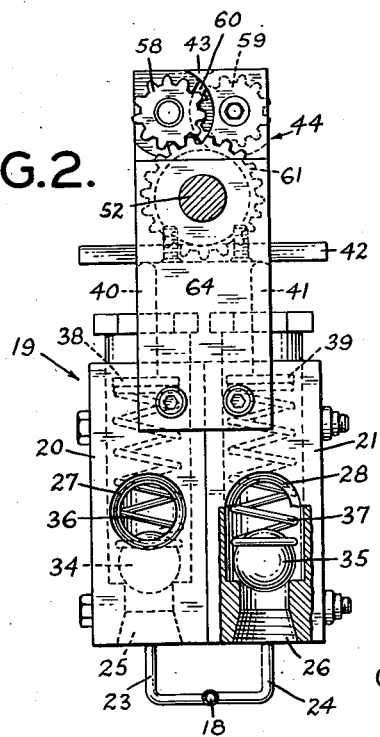

For a better understanding of the present invention, reference may be had to the accompanying drawing, in which:

Fig. 1 is a view in elevation of a typical system embodying the present invention with a portion of the hydraulic circuit illustrated diagrammatically; and Fig. 2 is a view in elevation of the differential and the equalizing valves, one of said valves being partially broken away to show details thereof.

The form of the invention chosen for purposes of illustration is adapted to elevate and lower a platform 10 although it will be understood that the same system may be used for lifting vehicles or other devices.

As shown in Fig. 1, the platform 10 is supported at its opposite ends by a pair of hydraulic jacks 11 and 12, each of which has a reciprocable piston and piston rod structure 13 and 14 therein. The jacks 11 and 12 may be mounted upon a frame member 15 which is supported on the floor or in any other desired way.

Hydraulic pressure for actuating the jacks to project the piston rods 13 and 14 is supplied by means of a motor driven pump 16 which is connected to a reservoir 17 for liquid.

The pressure port of the pump is connected by means of a conduit 18 to an equalizing valve 19 which includes two similar, separate valve elements 20 and 21.

The conduit 18 is provided with a pair of branch conduits 23 and 24 which are connected to ports 25 and 26 communicating with the lower ends of the valve elements 20 and 21. The valve 19 also includes a pair of ports 27 and 28 which are connected by means of the conduits 29 and 30 to the lower ends of the jacks 11 and 12, respectively. The conduits 29 and 30 are also provided with return conduit connections 31 and 32 by means of which liquid is drained from the jacks 11 and 12 to the reservoir 17 under the control of the valve 33.

The valve elements 20 and 21 include ball elements 34 and 35 which normally close the ports 25 and 26. The ball elements are urged downwardly by means of the springs 36 and 37 mounted in the valve elements and bearing at their upper ends against the disc elements 38 and 39. The disc elements of the valves 20 and 21 are mounted on the ends of push rods 40 and 41 which extend through the top of the valve casing and have their ends in engagement with a yoke or rock lever 42 which is mounted on the lower end of a plate 43 forming the spider of a differential 44.

The rate of flow of the liquid to the jacks 11 and 12 may be controlled by varying the biasing force of the springs 36 and 37 against ball valves 34 and 35. Thus, if the spring 36 is compressed to a greater degree than the spring 37 by moving the push rod or stem 40 downward, more of the liquid will tend to flow to the jack 12 than to the jack 11. The reverse is true also so that when the spring 37 is compressed more than the spring 36, more of the liquid will flow to the jack 11 than to the jack 12. Advantage is taken of this action to provide a control for the valve which will cause the jacks 11 and 12 to move equal distances at all times. This is accomplished by fixing to the piston rods 13 and 14 laterally projecting arms 45 and 46 and connecting to these arms flexible cables or tapes 47 and 48 for driving a differential system by means of which the movement of the push rods 40 and 41 is controlled. As shown in Fig. 1, the cables 47 and 48 are wound in opposite directions around the pulleys 49 and 50 which are mounted on the ends of the shafts 51 and 52. These shafts are rotatably mounted in suitable bearing blocks 53 and 54 which are fixed to the support 15.

The inner ends of the shafts 51 and 52 are connected to the differential 44 to change the biasing pressure on the valves in accordance with a differential rate of movement of the shafts 51 and 52.

As indicated above, the differential 44 includes a spider plate 43 which carries rotatably on its opposite sides a pair of idler pinions 58 and 59 which mesh with each other through a slot 60 through the spider 43. The pinion 58 meshes with a gear 61 fixed on the end of the shaft 52 and the pinion 59 meshes with a gear 62 fixed to the end of the shaft 51. The shaft 52 extends through the gear 61, the spider 43 and the gear 62 but is rotatable relative to the spider 43 and the gear 62.

The valve member 19 is maintained in fixed spaced relation to the differential by means of a pair of spaced apart arms 63 and 64 which are fixed to the valve 19 at their lower ends and journalled on the shafts 51 and 52, respectively. The valve 19 may be secured against rotation to the frame 19 or in any suitable way.

The differential mechanism operates as follows. So long as the shafts 51 and 52 rotate in opposite directions at the same speed, the idler pinions 58 and 59 idle freely without causing any movement of the spider 43. However, if one of the shafts rotates faster than the other, due to more rapid movement of the piston rod 13 or 14, this differential movement will cause the spider 43 to rock in one direction or the other around the axes of the shafts 51 and 52. Such rocking movement of the spider will cause a corresponding movement of the yoke or lever 42 with the result that one or the other of the push rods 40, 41 will be depressed, thereby increasing the pressure on the corresponding ball valve element 34 or 35. The increased pressure on the corresponding ball valve element will cause it to resist the flow of liquid to the jack or motor which is travelling at the higher speed. As a result, the speed of this jack is reduced so that the jacks move at the same rate and through the same distance.

The cables 47 and 48 are rewound on their pulleys as the piston rods 13 and 14 are retracted by means of the springs 66 and 67 or counterweights which are connected by means of the flexible cables 68 and 69 to the drums 70 and 71 about which the cables are wound. The cables 68 and 69 are wound in such a direction that the springs are tensioned as the pistons 13 and 14 are projected, thereby normally tending to return the shafts 51 and 52 in a proper direction to rewind the cables 47 and 48 on their respective drums 49 and 50.

While the invention has been described as applied to the control of two jacks, it will be understood that rotary hydraulic motors may be controlled in the same way by connecting these motors to the shafts 51 and 52, either directly or by means of gearing which causes the shafts 51 and 52 to rotate in the desired directions. In this way, the motors can be caused to rotate at the same speed even though their characteristics may differ, as is often the case.

It will be understood further that the differential may be modified substantially and that the several elements may be connected and supported in different ways than that illustrated, depending upon space requirements and the purpose for which the device is to be used. Therefore, the form of the invention described above should be considered as illustrative and not as limiting the scope of the following claims.

We claim:

1. In a system for regulating the supply of liquid from a pressure source to a pair of hydraulic motors to operate them at related speeds; the combination of a pair of check valves having spring biasing means normally urging them toward closed position, one of said valves being interposed between said source and one of said motors and the other being interposed between said source and the other motor to regulate the supply of liquid to said motors, said check valves being urged to open position by pressure of fluid from said pressure source in opposition to the spring biasing means, a differential having a pair of interconnected relatively rotary members and a third member maintained stationary when said rotary members are rotated at a predetermined relative speed, and movable when the relative speed of said rotary members varies, a connection between said third member and both of said valves to adjust the force exerted on the check valve by said spring biasing means to vary the rate of flow of liquid through said valves and means for connecting each of said relatively rotatable members to a different one of said motors to render said third member responsive to the relative speeds of said motors.

2. In a system for regulating the relative speeds of a pair of hydraulic motors driven by liquid supplied from a source of liquid under pressure; the combination of a pair of valves, each being interposed between said source and a different one of said motors, each of said valves including a check valve member and biasing means normally urging said member to closed position in opposition to flow of liquid to its corresponding motor, said check valve member being urged to open position by flow of liquid to its corresponding motor in opposition to said biasing means, means for varying the biasing force of said biasing means, a differential having a pair of interconnected relatively rotatable members and a third member movable in response to variation of relative rotation of said pair of members from a predetermined ratio, a connection between said third member and said means for varying the biasing action for actuating the latter to regulate the flow of liquid to the motors, and means connecting each rotatable member to a different one of said motors to render said third member responsive to the relative speeds of said motors.

3. In a system for regulating the relative speeds of a pair of hydraulic motors driven by liquid supplied from a source of liquid under pressure; the combination of a pair of valves, each being interposed between said source and a different one of said motors, each of said valves including a valve member and biasing means normally urging said member to closed position in opposition to flow of liquid to its corresponding motor, separate shiftable plungers for varying the biasing action of said biasing means, a rockable member engaging said plungers to shift them selectively to increase the biasing force on the valve members, a differential mechanism having a pair of relatively rotatable interconnected shafts, and a third member movable in response to variation in the relative rotation of said pair of members from a predetermined ratio, a connection between said third member and said rockable member for rocking the latter upon movement of said third member, and means for connecting each of said shafts to a different one of said motors to render said third member responsive to the relative speeds of said motors.

4. An equalizing valve for regulating the relative speeds of a pair of hydraulic motors comprising a valve casing having separate chambers therein, each chamber having an inlet port, an outlet port and a valve seat between the inlet port and the chamber, a valve member in each chamber engageable with its valve seat, said valve member and seat constituting a check valve permitting flow of liquid from said inlet port to said outlet port and preventing flow of liquid from said outlet port to said inlet port, spring means in each chamber urging the valve member toward its seat in opposition to fluid pressure at said inlet port, a plunger member for each chamber engaging the spring means therein, said plunger member being movable relative to said valve member to vary the pressure of the spring means on the valve member, and means engaging both of the plungers for selectively moving them.

BENJAMIN N. ASHTON.
EUGENE V. BARKOW.

REFERENCES CITED

The following references are of record in the file of this patent:

UNITED STATES PATENTS

| Number | Name | Date |
|---|---|---|
| 955,852 | Coyle | Apr. 26, 1910 |
| 1,962,924 | Bristol | June 12, 1934 |
| 2,328,849 | Schoelm | Sept. 7, 1943 |
| 2,350,795 | Monier | June 6, 1944 |
| 2,359,961 | Anthony | Oct. 10, 1944 |
| 2,376,320 | Butrovich et al. | May 22, 1945 |
| 2,380,973 | Kopp | Aug. 7, 1945 |
| 2,438,389 | Edge | Mar. 23, 1948 |
| 2,472,944 | Furer et al. | June 14, 1949 |
| 2,484,908 | Purcell | Oct. 18, 1949 |